US008187725B2

(12) United States Patent
Kiser et al.

(10) Patent No.: US 8,187,725 B2
(45) Date of Patent: May 29, 2012

(54) WELDING ALLOY AND ARTICLES FOR USE IN WELDING, WELDMENTS AND METHOD FOR PRODUCING WELDMENTS

(75) Inventors: Samuel D. Kiser, Lenoir, NC (US); Brian A. Baker, Kitts Hill, OH (US); David E. Waskey, Bedford, VA (US)

(73) Assignees: Huntington Alloys Corporation, Huntington, WV (US); Areva NP Inc., Lynchburg, VA (US)

( * ) Notice: Subject to any disclaimer, the term of this patent is extended or adjusted under 35 U.S.C. 154(b) by 297 days.

(21) Appl. No.: 12/529,427

(22) PCT Filed: Jul. 19, 2007

(86) PCT No.: PCT/US2007/073856
§ 371 (c)(1),
(2), (4) Date: Feb. 2, 2010

(87) PCT Pub. No.: WO2008/021650
PCT Pub. Date: Feb. 21, 2008

(65) Prior Publication Data
US 2010/0136368 A1    Jun. 3, 2010

Related U.S. Application Data

(60) Provisional application No. 60/836,316, filed on Aug. 8, 2006.

(51) Int. Cl.
*B32B 15/04* (2006.01)
*C22C 19/05* (2006.01)
*B23K 35/22* (2006.01)
(52) U.S. Cl. ........ 428/680; 428/586; 148/428; 420/448; 420/449; 420/450; 420/453; 228/262.1; 219/146.22; 219/146.23; 219/146.41; 75/302

(58) Field of Classification Search .................. 428/680, 428/586
See application file for complete search history.

(56) References Cited

U.S. PATENT DOCUMENTS
3,893,851 A    7/1975  Culling
(Continued)

FOREIGN PATENT DOCUMENTS
JP    10-193174    *  7/1998
(Continued)

OTHER PUBLICATIONS
Machine Translation, Hamano et al., JP 10-193174, Jul. 1998.*
(Continued)

*Primary Examiner* — Michael LaVilla
(74) *Attorney, Agent, or Firm* — The Webb Law Firm

(57) ABSTRACT

A nickel, chromium, iron alloy and method for use in producing weld deposits and weldments formed therefrom. The alloy comprises, in weight percent, about 28.5 to 31.0% chromium; about 0 to 16% iron; less than about 1.0% manganese; about 2.1 to 4.0% niobium plus tantalum; 1.0 to 6.5% molybdenum; less than 0.50% silicon; 0.01 to 0.35% titanium; 0 to 0.25% aluminum; less than 1.0% copper; less than 1.0% tungsten; less than 0.5% cobalt; less than about 0.10% zirconium; less than about 0.01% sulfur; less than 0.01% boron; less than 0.03% carbon; less than about 0.02% phosphorous; 0.002 to 0.015% magnesium plus calcium; and balance nickel and incidental impurities. The method includes the steps of forming a welding electrode from the above alloy composition and melting the electrode to form a weld deposit. A preferred weldment may be in the form of a tubesheet of a nuclear reactor.

24 Claims, 1 Drawing Sheet

Microstructure of Heat 5 showing serpentine grain boundary microstructure after strain to fracture of 5.7%

U.S. PATENT DOCUMENTS

| | | | |
|---|---|---|---|
| 4,400,211 | A | 8/1983 | Kudo et al. |
| 4,410,489 | A | 10/1983 | Asphahani et al. |
| 4,415,530 | A | 11/1983 | Hunt |
| 4,689,279 | A | 8/1987 | Hull et al. |
| 4,765,956 | A | 8/1988 | Smith et al. |
| 4,806,305 | A | 2/1989 | Oliver |
| 4,935,201 | A | 6/1990 | Inoue et al. |
| 5,082,625 | A | 1/1992 | Kato et al. |
| 5,372,662 | A | 12/1994 | Ganesan et al. |
| 5,496,419 | A | 3/1996 | Murakami et al. |
| 5,516,485 | A | 5/1996 | Culling |
| 6,132,527 | A | 10/2000 | Hessell et al. |
| 6,242,112 | B1 | 6/2001 | Forsberg et al. |
| 6,242,113 | B1 | 6/2001 | Kiser |
| 6,258,317 | B1 | 7/2001 | Smith et al. |
| 6,605,164 | B2 | 8/2003 | Kennedy et al. |
| 6,623,869 | B1 | 9/2003 | Nishiyama et al. |
| 6,764,646 | B2 | 7/2004 | Crook et al. |
| 6,797,232 | B2 | 9/2004 | Speidel et al. |
| 6,997,994 | B2 | 2/2006 | Sudo |
| 2002/0036037 | A1 | 3/2002 | Kennedy et al. |
| 2002/0057984 | A1 | 5/2002 | Speidel et al. |
| 2002/0068007 | A1 | 6/2002 | Itoh et al. |
| 2004/0062677 | A1 | 4/2004 | Chabenat et al. |
| 2004/0115086 | A1 | 6/2004 | Chabenat et al. |
| 2004/0156738 | A1* | 8/2004 | Kanzaki ........................ 420/447 |
| 2005/0047953 | A1 | 3/2005 | Hieber et al. |
| 2005/0129567 | A1 | 6/2005 | Kirchheiner et al. |
| 2005/0265887 | A1 | 12/2005 | Toji et al. |
| 2007/0272671 | A1* | 11/2007 | Nakajima et al. ........ 219/146.22 |

FOREIGN PATENT DOCUMENTS

| WO | WO 2005/070612 | * | 8/2005 |
|---|---|---|---|

OTHER PUBLICATIONS

"Specification for Nickel and Nickel-Alloy Bare Welding Electrodes and Rods", ANSI/AWS A5.14/A5.14M-97, Dec. 8, 1997 (3 pp.), American Welding Society, Miami, FL.

"Specification for Nickel and Nickel-Alloy Welding Electrodes for Shielded Metal Arc Welding", ANSI/AWS A5.11/A5.11M-97, Nov. 6, 1997 (3 pp.), American Welding Society, Miami, FL.

* cited by examiner

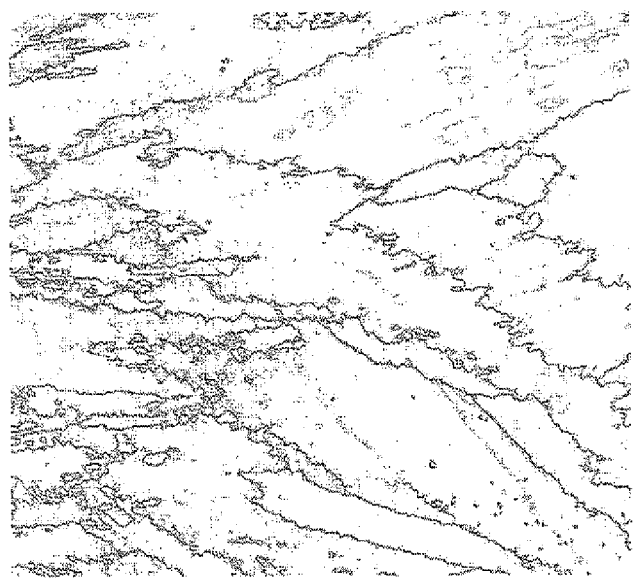
Microstructure of Heat 5 showing serpentine grain boundary microstructure after strain to fracture of 5.7%

WELDING ALLOY AND ARTICLES FOR USE IN WELDING, WELDMENTS AND METHOD FOR PRODUCING WELDMENTS

BACKGROUND OF THE INVENTION

1. Field of the Invention

This invention relates to a nickel, chromium, iron, molybdenum, niobium, welding alloy, articles made therefrom for use in producing weldments, and weldments and methods for producing these weldments.

2. Description of Related Art

Heretofore, in various welding applications, including equipment used in nuclear power generation, weldments are required that provide resistance to various cracking phenomenon. This includes not only intergranular stress corrosion cracking ("IGSCC") but hot-cracking, cold cracking (DDC), and root cracking as well.

During the lives of commercial and military nuclear power generation equipment, the nuclear industry has replaced the first generation of nickel alloys that had only 14-15% chromium with a family that now contains about 30% chromium. This family of alloys is virtually immune to IGSCC, but other issues have been discovered about the welding products of the same family. The initial 30% chromium welding products (UNS N06052) contain about 0.50% Al and 0.50% Ti and have reasonably good general weldability. However, the aluminum content nearly always contributes to floating oxide impurities on many of the weld beads in spite of scrupulous efforts to provide excellent gas shielding. These oxides, if not removed by grinding, will often find their way into the interior of multi-pass welds and appear as inclusions which are detectable by radiography or ultrasonic inspection methods. This condition is unacceptable when encountered during the repair of operating nuclear plant components that are radioactively "hot". In addition, deposits made using these welding products are susceptible to ductility-dip cracking ("DDC").

A new family of 30% chromium nickel alloy welding products was introduced early in the $21^{st}$ century that addressed these issues. This alloy family (UNS N06054) exhibited reduced aluminum and titanium contents and had additions of boron, zirconium and niobium. These products were capable of producing very clean weld deposits without the floating oxide impurities of the previous family. In addition, they provided improved resistance to DDC, but under conditions of unfavorable bead shape and very high heat input per unit volume of weld metal added, occasional DDC fissures were found. This family also exhibited resistance to "root cracking" and solidification cracking as described in U.S. Pat. No. 6,242,113 to Kiser.

The present invention overcomes the shortcomings of the prior art by providing a nickel, chromium, iron, molybdenum, niobium welding alloy and weldments made therefrom that provide the desired strength and corrosion resistance in addition to resistance to solidification cracking, DDC, root cracking, as well as stress corrosion cracking. Additionally, the present invention provides a welding alloy of the nickel, chromium, iron, molybdenum, niobium type in a variety of forms that is particularly adapted for uses in fabricating and repair of equipment used in nuclear power generation.

SUMMARY OF THE INVENTION

In accordance with the invention, there is provided a nickel, chromium, iron, molybdenum, niobium alloy for use in producing weld deposits. The alloy is also referred to herein simply as a Ni—Cr—Fe alloy. The alloy comprises, in weight percent, about 28.5 to 31.0% chromium; about 0 to 16% iron, preferably 7.0 to 10.5% iron; less than about 1.0% manganese, preferably 0.05 to 0.35% manganese; about 2.1 to 4.0% niobium plus tantalum, preferably 2.1 to 3.5% niobium plus tantalum, and more preferably 2.2 to 2.8% niobium plus tantalum; 0 to 7.0% molybdenum, preferably 1.0 to 6.5% molybdenum, and more preferably 3.0 to 5.0% molybdenum; less than 0.50% silicon, preferably 0.05 to 0.30% silicon; 0.01 to 0.35% titanium; 0 to 0.25% aluminum; less than 1.0% copper; less than 1.0% tungsten; less than 0.5% cobalt; less than about 0.10% zirconium; less than about 0.01% sulfur; less than 0.01% boron, preferably less than 0.0015% boron, and more preferably less than 0.001% boron; less than 0.03% carbon; less than about 0.02% phosphorus; 0.002 to 0.015% magnesium plus calcium, and balance nickel and incidental impurities.

The alloy exhibits adequate stress corrosion cracking resistance in view of the chromium content. The alloy may be in the form of a weld deposit, a welding electrode, a welding electrode in the form of a wire or strip with a flux cover, a welding electrode in the form of a sheath with a flux core, a weld deposit overlay or a weldment comprising an alloy substrate, such as steel with an overlay of the alloy of the invention. The alloy of the present invention may be used in a method for producing a weld deposit or weldment in the form of a flux-covered electrode used for producing a weld deposit A weldment of the present invention may be in the form of a tube sheet of a nuclear reactor. The alloy may be further used as an article for producing a weldment, with the article being in the form of wire, strip, sheet, rod, electrode, pre-alloyed powder, or elemental powder. According to the present invention, the method for producing the weld deposit may include producing a flux-covered electrode made from the alloy defined above of a nickel/chromium wire or a nickel/chromium/iron wire and melting the electrode to produce a weld deposit.

BRIEF DESCRIPTION OF THE DRAWING

FIG. 1 is a photomicrograph of an alloy of the present invention exhibiting the preferred, serpentine grain boundary microstructure.

DETAILED DESCRIPTION OF THE INVENTION

The NiCrFeMoNb welding alloy in accordance with the invention (also referred to herein as a Ni—Cr—Fe alloy) has sufficient chromium along with considerably tight control of secondary chemical constituents, as well as trace elements, to provide suitable corrosion resistance and excellent stress corrosion cracking resistance. In addition, the alloy is resistant to solidification cracking, to root cracking, and to DDC under adverse heating and reheating conditions. The welding alloy of the present invention is also designed to provide resistance to DDC cracking under conditions of both high and low iron dilution.

In order to confer resistance to solidification cracking, the alloy should have adequate solubility for its alloying elements and a narrow liquidus to solidus temperature range. Also, it should have low levels of sulfur, phosphorus and other low-melting elements, and it should contain minimum levels of elements that form low-melting point phases in the alloy.

Resistance to DDC is controlled by increasing the high-temperature strength and ductility at the grain boundaries and by creating irregularly shaped grain boundaries, referred to herein as "serpentine grain boundaries". Good strength and ductility of grain boundaries is provided by boron, zirconium and niobium within the limits of the invention. While boron and zirconium participate at the grain boundary level, zirconium tends to deoxidize the boundaries while the boron helps control carbide morphology. With sufficient niobium to form both primary and secondary MC type carbides, lower boron levels tend to enhance the formation of MC type carbides and reduce the tendency for solidification cracking. Also, boron less than 0.015% and preferably less than 0.001% retards the formation of $M_{23}C_6$ carbides by lowering the solvus temperature of the $M_{23}C_6$ and slowing the rate of reaction which, in turn, reduces cracking tendency. See Table I. As mentioned above, all compositional percentages are expressed herein in weight %.

The onset of MC carbide formation usually occurs in the liquid melt. However, it can occur as low as the range of 1150° C. to 1200° C. This provides sufficient time upon cooling of the weld bead for these MC carbides to pin migrating grain boundaries in a multiplicity of points forcing the migrated boundaries to be very irregular or serpentine. By replacing the long, straight grain boundaries (that are prone to DDC) with serpentine grain boundaries, a mechanically interlocking network is produced that provides outstanding resistance to DDC. See FIG. 1. Molybdenum is a scavenger for boron and known to form $Mo_2B$, a MC-like precipitate. Molybdenum is also suspected to perform the role of a catalyst in its contribution toward controlling the size and dispersion of MC carbides while not participating directly in forming carbides of the MC type. Thus, niobium and molybdenum, by their reactions with carbon and boron, respectively, form the precipitates that pin the migrating grain boundaries that result in the formation of the serpentine grain boundary microstructure that creates the DDC resistance during cooling of the weld pool. Because titanium, tantalum and tungsten are known to form MC type carbides, it is envisioned that partial replacement of the niobium, on an atomic basis, with one or more of these elements is feasible. Boron and zirconium at higher levels than prescribed by the limits of the alloy composition of the invention are detrimental and contribute to solidification cracking due to their suppression of the solidus (final freezing temperature of the last liquid to freeze).

A "Strain-To-Fracture" test developed by The Ohio State University is believed to represent a valid and quantifiable method of determining any enhancement to resistance to DDC. This test is described in the December 2003 issue of the Welding Journal, pp. 355-S to 364-S. This test measures the degree of DDC as a function of strain at constant temperature. The number of cracks at a fixed strain are measured metallographically. Results of several compositions within and outside the optimum compositional range are shown in Table II along with selected data showing resistance to hot cracking. Resistance to root cracking is improved by the current invention by maintaining low aluminum, titanium, and manganese coupled with controlled amounts of boron, silicon and zirconium. The invention provides resistance to solidification cracking, DDC, and stress corrosion cracking by virtue of these balanced amounts of aluminum, titanium, zirconium, boron, silicon and chromium in the nickel matrix. Aluminum and titanium are kept low to combat floating oxide formation and to reduce the tendency for root cracking. However, even a small amount of titanium is beneficial in helping to resist IGSCC. Lower levels of manganese help reduce the tendency for root cracking and are permissible with the low sulfur levels attainable with the AOD+ESR melting process. Additionally, manganese levels of less than 1.0% and preferably less than 0.40% tend to suppress the formation of $M_{23}C_6$ carbides much the same as that of boron. See Table I.

TABLE I

SOLVUS OF $M_{23}C_6$ CARBIDE FOR MODEL COMPOSITIONS DETERMINED USING PREDICTIVE SOFTWARE*

| Alloy | Ni | Al | Cr | Fe | Mn | Nb | Si | Ti | B | C | N | $M_{23}C_6$ Solvus, ° F. |
|---|---|---|---|---|---|---|---|---|---|---|---|---|
| Base | Bal. | 0.1 | 30 | 8 | 0.2 | 0.2 | 0.12 | 0.2 | 0.0005 | 0.02 | 0.02 | 1937 |
| Base + 0.002B | Bal. | 0.1 | 30 | 8 | 0.2 | 0.2 | 0.12 | 0.2 | 0.0005 | 0.02 | 0.02 | 1974 |
| Base + 2Mn | Bal. | 0.1 | 30 | 8 | 0.2 | 0.2 | 0.12 | 0.2 | 0.0005 | 0.02 | 0.02 | 1962 |
| Base + 2.5Nb | Bal. | 0.1 | 30 | 8 | 0.2 | 0.2 | 0.12 | 0.2 | 0.0005 | 0.02 | 0.02 | 1654 |
| Base + 4Mo + 2.5Nb | Bal. | 0.1 | 30 | 8 | 0.2 | 0.2 | 0.12 | 0.2 | 0.0005 | 0.02 | 0.02 | 1604 |

*JMatPro software, Version 3.0, from Sente Software

TABLE II

PERFORMANCE OF VARIOUS HEATS IN DDC AND HOT CRACKING RESISTANCE

| Heats | Fe | Nb | Ti | Al | Mn | Mo | B | C | Zr | Cr | S |
|---|---|---|---|---|---|---|---|---|---|---|---|
| 1 | 8.22 | 0.83 | 0.24 | 0.11 | 0.8 | 0.01 | 0.003 | 0.027 | 0.01 | 30 | 0.0006 |
| 2 | 8.42 | 0.85 | 0.21 | 0.1 | 0.81 | 0.02 | 0.004 | 0.02 | 0.015 | 30 | 0.0014 |
| 3 | 8.33 | 0.78 | 0.19 | 0.13 | 0.68 | 0.02 | 0.001 | 0.014 | 0.001 | 29.5 | 0.0007 |
| 4 | 9.03 | 1 | 0.2 | 0.01 | 0.68 | 4 | 0.004 | 0.02 | 0.006 | 30 | 0.0008 |
| 5 | 8.24 | 2.5 | 0.2 | 0.03 | 0.79 | 4.1 | 0.0011 | 0.02 | 0.008 | 30.2 | 0.001 |
| 6 | 8.04 | 0.82 | 0.19 | 0.12 | 0.77 | 0.01 | 0.001 | 0.03 | 0.008 | 29.5 | 0.001 |

| Heats | $M_{23}C_6$ Solvus ° F.** | Testing Conducted at 950° C. Number of DDCs at each % Strain | | | | | | Metallographic Hot Crack Count | |
|---|---|---|---|---|---|---|---|---|---|
| | | 1% | 2% | 3% | 4% | 5% | 6% | 8% | Number Per in$^2$* | Sum of lengths |
| 1 | 1904 | 0 | 1 | 2 | 3 | nt | 32 | nt | >60 | >1" |
| 2 | 1983 | 0 | Nt | 5 | 14 | nt | nt | >99 | >50 | >1" |
| 3 | 1904 | 0 | 3 | Nt | 16 | nt | nt | nt | <20 | <0.2" |

TABLE II-continued

PERFORMANCE OF VARIOUS HEATS IN DDC AND HOT CRACKING RESISTANCE

| 4 | 1950 | 0 | 0 | 2 | 1 | nt | 2 | nt |
| 5 | 1580 | 0 | 0 | 0 | 0 | 0 | 0 | nt |
| 6 | 1995 | | | | | | <20 | <0.2" |

\*= Number of cracks per square inch in as-welded v-groove as measured metallographically in cross section. Cracks are the sum of both the hot and ductility dip cracks.
nt = number of cracks were not measured
\*\*= Predicted using JMatPro software, version 3.0, by Sente Software While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A Ni—Cr—Fe alloy comprising in weight percent: 28.5 to 31.0% Cr, up to 11% Fe, less than 1.0% Mn, 2.1 to 4.0% Nb+Ta, 1.0 to 7.0% Mo, less than 0.50% Si, 0.01 to 0.35% Ti, up to 0.25% Al, less than 0.20% Cu, less than 1.0% W, less than 0.12% Co, less than 0.10% Zr, less than 0.01% S, less than 0.01% B, less than 0.03% C, less than 0.02% P, 0.002 to 0.015% Mg+Ca, balance Ni plus incidental impurities.

2. The alloy of claim 1 containing 7.0 to 10.5% Fe, 0.05 to 0.35% Mn, 2.1 to 3.5% Nb+Ta, 1.0 to 6.5% Mo, 0.05 to 0.30% Si, and less than 0.0015% B.

3. The alloy of claim 1 containing 2.2 to 2.8% Nb+Ta, 3.0 to 5.0% Mo, and less than 0.0010% B.

4. The alloy of claim 1 nomially containing 30% Cr, 8% Fe, 2.5% Nb+Ta, 4% Mo, less than 0.35% Mn, 0.2% Ti, 0.03% Al, 0.008% Zr, 0.02% C, and less than 0.001% B.

5. The alloy of claim 1 in a weld deposit wherein said weld deposit contains a microstructure exhibiting serpentine grain boundaries.

6. A welding electrode comprising the alloy of claim.

7. The welding electrode of claim 6 in the form of a flux-covered electrode.

8. The welding electrode of claim 6 in the form of wire or rod.

9. The welding electrode of claim 6 in the form of a sheath with a flux core.

10. The alloy of claim 1 containing less than 1% Fe.

11. An article, for producing a weldment, made from the alloy of claim 1.

12. The article of claim 11 in the form of wire, strip, rod, electrode, pre-alloyed powder or elemental powder.

13. A method for producing a weldment, comprising forming a welding electrode of a Ni—Cr—Fe alloy comprising in weight percent: 28.5 to 31.0% Cr, up to 11% Fe, less than 1.0% Mn, 2.1 to 4.0% Nb+Ta, 1.0 to 70% Mo, less than 0.50% Si, 0.01 to 0.35% Ti, up to 0.25% Al, less than 0.20% Cu, less than 1.0% W, less than 0.12% Co, less than 0.10% Zr, less than 0.01% S, less than 0.01% B, less than 0.03% C, less than 0.02% P, 0.002 to 0.015% Mg+Ca, balance Ni plus incidental impurities; and melting the electrode to form a weld deposit.

14. The method of claim 13, wherein the alloy contains 7.0 to 10.5% Fe, 0.05 to 0.35% Mn, 2.1 to 3.5% Nb+Ta, 1.0 to 6.5% Mo, 0.05 to 0.30% Si, and less than 0.0015% B.

15. The method of claim 13, wherein the alloy contains 2.2 to 2.8% Nb+Ta, 3.0 to 5.0% Mo, and less than 0.0010% B.

16. The method of claim 13, wherein the alloy nominally contains 30% Cr, 8% Fe, 2.5% Nb+Ta, 4% Mo, less than 0.35% Mn, 0.2% Ti, 0.03% Al, 0.008% Zr, 0.02% C, and less than 0.001% B.

17. The method of claim 13, wherein the alloy contains less than 1% Fe.

18. A weldment comprising an alloy substrate and a weld deposit overlay thereon, said weld deposit overlay comprising in percent by weight: 28.5 to 31.0% Cr, up to 11% Fe, less than 1.0% Mn, 2.1 to 4.0% Nb+Ta, 1.0 to 7.0% Mo, less than 0.50% Si, 0.01 to 0.35% Ti, up to 0.25% Al, less than 0.20% Cu, less than 1.0% W, less than 0.12% Co, less than 0.10% Zr, less than 0.01% S, less than 0.01% B, less than 0.03% C, less than 0.02% P, 0.002 to 0.015% Mg+Ca, balance Ni plus incidental impurities.

19. A weldment of claim 18, wherein said weld deposit overlay contains 7.0 to 10.5% Fe, 0.05 to 0.35% Mn, 2.1 to 3.5% Nb+Ta, 1.0 to 6.5% Mo, 0.05 to 0.30% Si, and less than 0.0015% B.

20. A weldment of claim 18, wherein said weld deposit overlay contains 2.2 to 2.8% Nb+Ta, 3.0 to 5.0% Mo, and less than 0.0010% B.

21. A weldment of claim 18, wherein said weld deposit overlay nominally contains 30% Cr, 8% Fe, 2.5% Nb+Ta, 4% Mo, less than 0.35% Mn, 0.2% Ti, 0.03% Al, 0.008% Zr, 0.02% C, and less than 0.001% B.

22. The weldment of claim 18 in the form of a tubesheet of a tubesheet of a nuclear reactor.

23. The weldment of claim 18, wherein the weld deposit overlay contains less than 1% Fe.

24. The weldment of claim 18, wherein the weld deposit overlay contains a microstructure characterized by serpentine grain boundaries.

\* \* \* \* \*

UNITED STATES PATENT AND TRADEMARK OFFICE
CERTIFICATE OF CORRECTION

PATENT NO. : 8,187,725 B2
APPLICATION NO. : 12/529427
DATED : May 29, 2012
INVENTOR(S) : Samuel D. Kiser et al.

It is certified that error appears in the above-identified patent and that said Letters Patent is hereby corrected as shown below:

Column 5, Line 35, Claim 4, delete "nomially" and insert -- nominally --

Column 5, Line 41, Claim 6, after "claim" insert -- 1. --

Column 5, Line 56, Claim 13, delete "70" and insert -- 7.0 --

Column 6, Line 49, Claim 22, after "form" delete "of a tubesheet"

Signed and Sealed this
Twenty-fifth Day of September, 2012

David J. Kappos
*Director of the United States Patent and Trademark Office*